Oct. 17, 1967     D. N. RENNEKER     3,347,592
RETRACTABLE ROOF FOR AUTOMOTIVE VEHICLE
Filed Aug. 26, 1965     3 Sheets-Sheet 1

INVENTOR.
Dennis N. Renneker
BY
Edward E. James
ATTORNEY

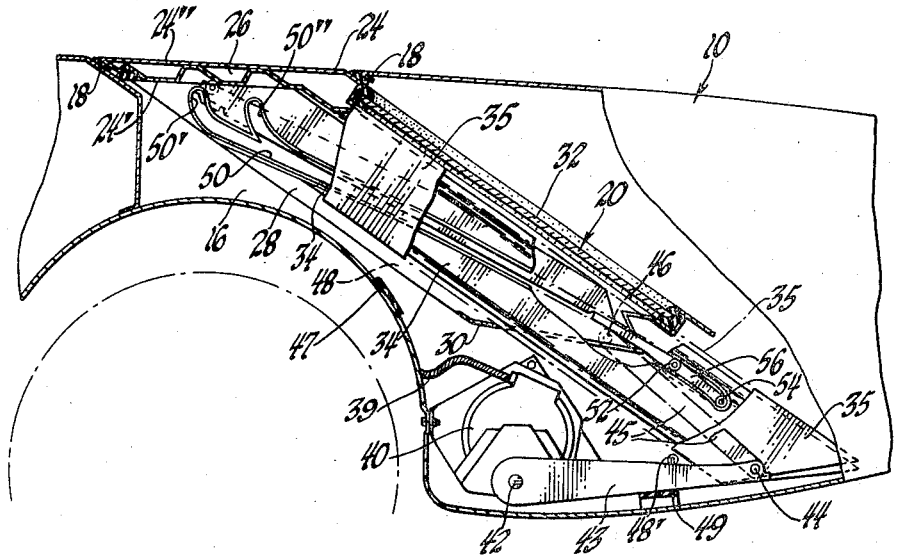
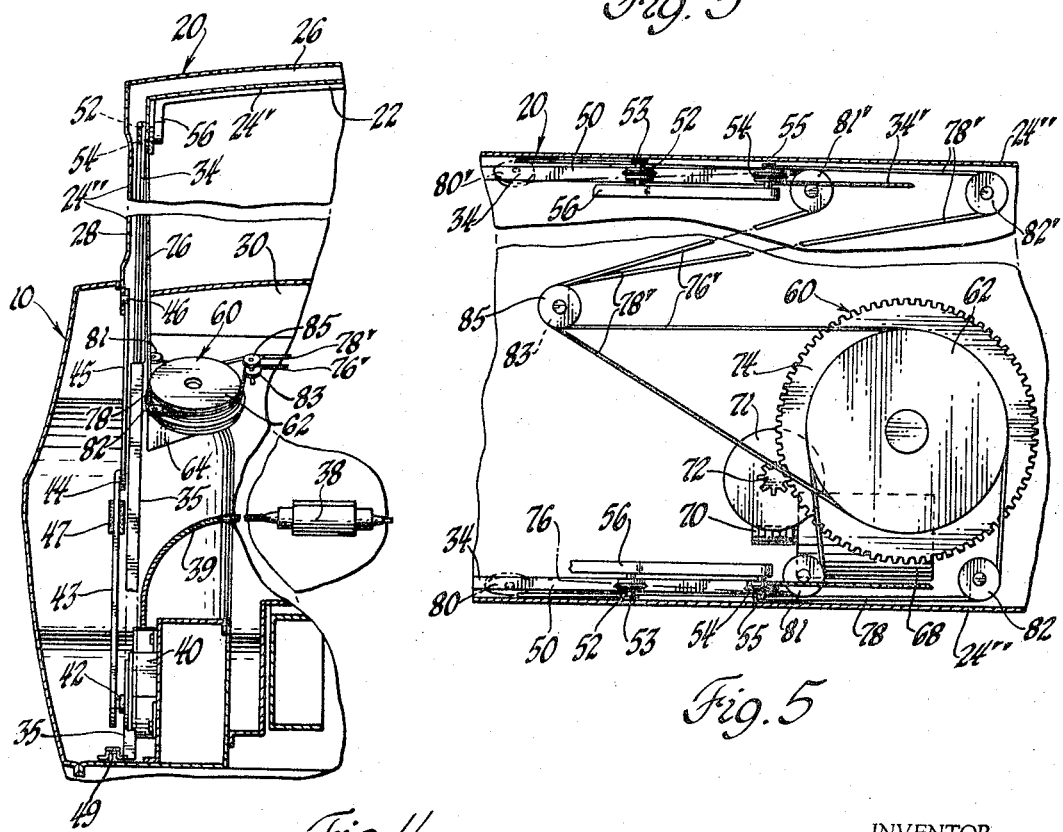

Oct. 17, 1967   D. N. RENNEKER   3,347,592
RETRACTABLE ROOF FOR AUTOMOTIVE VEHICLE
Filed Aug. 26, 1965   3 Sheets-Sheet 3
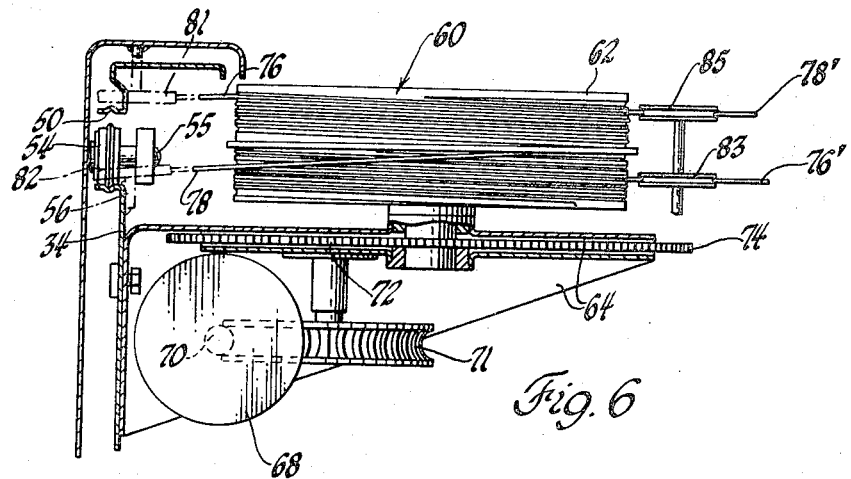
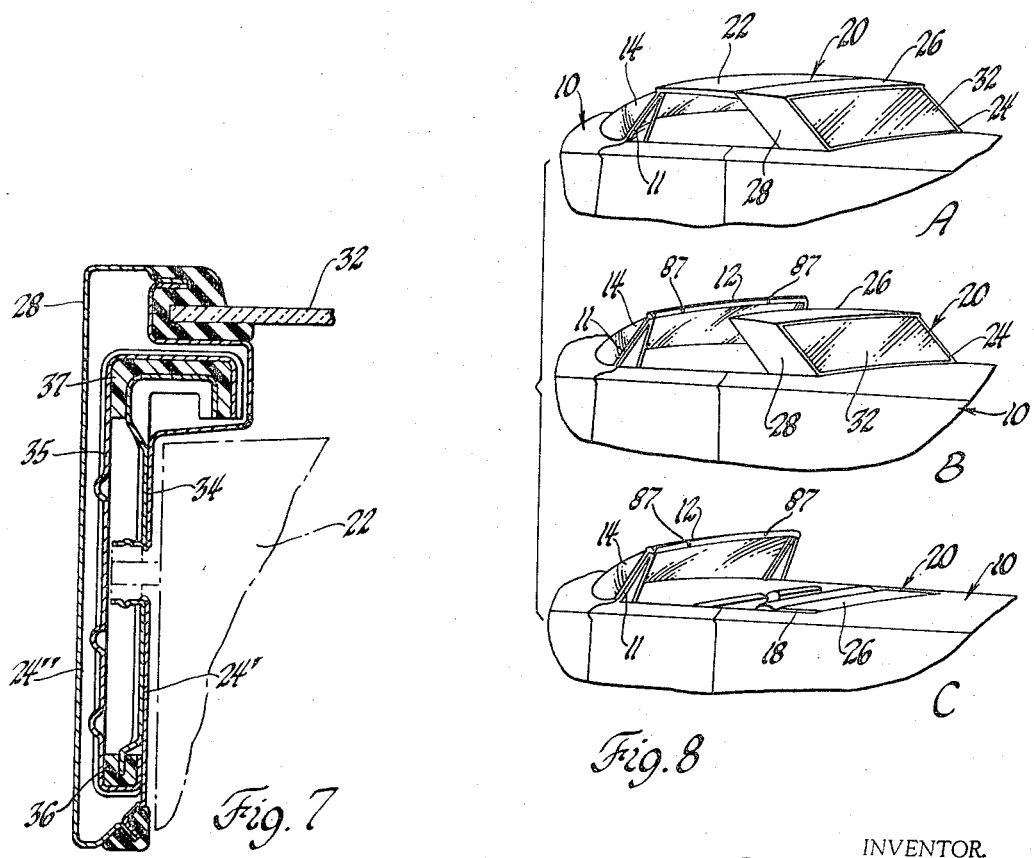
INVENTOR.
Dennis N. Renneker
BY
Edward E. James
ATTORNEY United States Patent Office 3,347,592
Patented Oct. 17, 1967

3,347,592
RETRACTABLE ROOF FOR AUTOMOTIVE VEHICLE
Dennis N. Renneker, Warren, Mich., assignor to General Motors Corporation, Detroit, Mich., a corporation of Delaware
Filed Aug. 26, 1965, Ser. No. 482,693
5 Claims. (Cl. 296—107)

ABSTRACT OF THE DISCLOSURE

A vehicle body is provided with a retractable hardtop comprising a forward section and rear section. In the raised position of the top the forward section extends horizontally into engagement with the header, while the rear section is vertically angled. The forward section is retractable to a vertically inclined position within the confines of the rear section to form a landau type vehicle. Both sections are then retractable as a unit linearly into a storage compartment provided in the body between the vehicle rear seat and the trunk. Separate actuating mechanisms are provided for moving both top sections, while solenoid locks, interconnected by a control system, are actuatable to lock the top sections in the various positions. The rear section roof portion closes the storage compartment in top lowered position, while an included lower package shelf serves to close the compartment in top raised position.

Specification

This invention relates to a retractable roof for a convertible type automotive vehicle and more particularly to a hardtop roof for such a vehicle having relatively rigid roof sections telescopically supported and retractable to a body stored position and extensible therefrom to a body closing position.

In conventional convertibles, foldable top supporting frames have generally included a plurality of pivotally interconnected and linkage controlled rail sections. These rail sections are folded longitudinally of the body in substantially straight line paths between raised and lowered positions. The rear side rails and control links are pivotally mounted rearwardly of the body within two top well extensions flanking the rear seat. The frame supported top is usually foldable to a down position at least partially retracted into a transverse well located behind the rear seat. The top wells required for such conventional folding tops substantially reduce the usable dimensions of the rear seat passenger compartment and the rear luggage compartment of such a convertible relative to those of a closed body style. Such tops also tend to preclude the satisfactory design and manufacture of a suitable four-door convertible since they are pivotally supported on the side wall areas normally required for the rear door openings. The height of the folded frame is generally accommodated by reducing the rear wheel housing below the height normally used for closed body styles and by permitting the stacked rails and bows of the frame to protrude slightly above the belt line defining surfaces of the vehicle body.

Recently a number of retractable hardtop roofs have been developed for convertible automobiles of contemporary configuration. These retractable hardtop convertibles generally have a main roof portion mounted for power actuated movement between a raised body closing position and a lowered roof storing position either contained within or overlying the rear luggage compartment. Hence, the length, height and shape of such a hardtop roof is dictated by the luggage compartment space and/or by the rear deck contour of the vehicle body. When stored, such a retractable roof obstructs any reasonable use of the rear luggage compartment. Hardtop roofs of this type have also been quite heavy and have necessarily required relatively heavy roof supporting body structure, multiple heavy duty motors and complex timing controls capable of providing sufficient power and proper synchronization of the several roof and deck lid actuating motors. Such top supporting structure and actuating components are expensive and generally encroach on the rear seat passenger compartment and on the rear luggage compartment even when the top is raised.

The instant invention contemplates an improved retractable hardtop roof of light-weight, two-piece construction; which provides a contemporary roof contour independently of the size and shape of the rear deck and luggage compartment of the vehicle; which permits the use of relatively simple roof actuating mechanisms and timing controls; which minimize roof storage and actuator encroachment of the rear luggage compartment; which is self-concealing when retracted to its storage position within the vehicle body; and which may be partially raised to provide a landau-type vehicle.

In an illustrative embodiment of the invention, a rear roof forming member or section has an upper roof panel and a lower package shelf forming panel which extend transversely between two rear pillar forming side panels. A rear window is suitable mounted and extends transversely of the vehicle between the several rear roof forming panels. The two side panels of this rear roof section are slidably and telescopically mounted on two vertically inclined support members spaced laterally of the vehicle body. These support members thus mount the rear roof section for reciprocable linear movement between a raised position projecting upwardly from a top storage well or compartment provided in the vehicle body and a body-stored retracted position wherein the rear roof panel is co-extensive with the rear deck and quarter panel surfaces of the vehicle and thus sealingly closes the top storing well. A forward roof forming member or section is mounted by the opposite side panels of the rear roof section for guided movement between a retracted body opening position normally contained within the retracted rear roof section and a body closing position extending forwardly of the raised rear section. When extended, this forward roof forming member sealingly engages a transverse header framing and supporting the upper edge of the front windshield. Locking means associated with a power driven rear roof actuating mechanism is adapted to lock the rear roof section in its raised position. Such locking action conditions a second power driven mechanism to provide subsequent selective actuation of the forward roof section between its retracted and extended body closing positions.

The foregoing and other objects, advantages and features of the invention will be apparent from the following description of the illustrative embodiment having reference to the accompanying drawings, in which:

FIGURE 3 is a view similar to FIGURE 2 and shows the several hardtop roof elements in their retracted, top well closing stored positions;

FIGURE 4 is a fragmentary sectional view taken through the vehicle body and the raised top substantially in the plane indicated at 4—4 of FIGURE 2 and further illustrates both the rear and forward roof actuating drive mechanisms;

FIGURE 5 is a fragmentary sectional view taken through the vehicle body substantially in the plane of the line indicated at 5—5 of FIGURE 2 and further illustrates the forward roof actuating drive mechanism;

FIGURE 6 is another sectional view illustrating the pulley and cable drive of the forward roof section and is taken substantially in the plane indicated at 6—6 in FIGURE 2;

Figure 2:
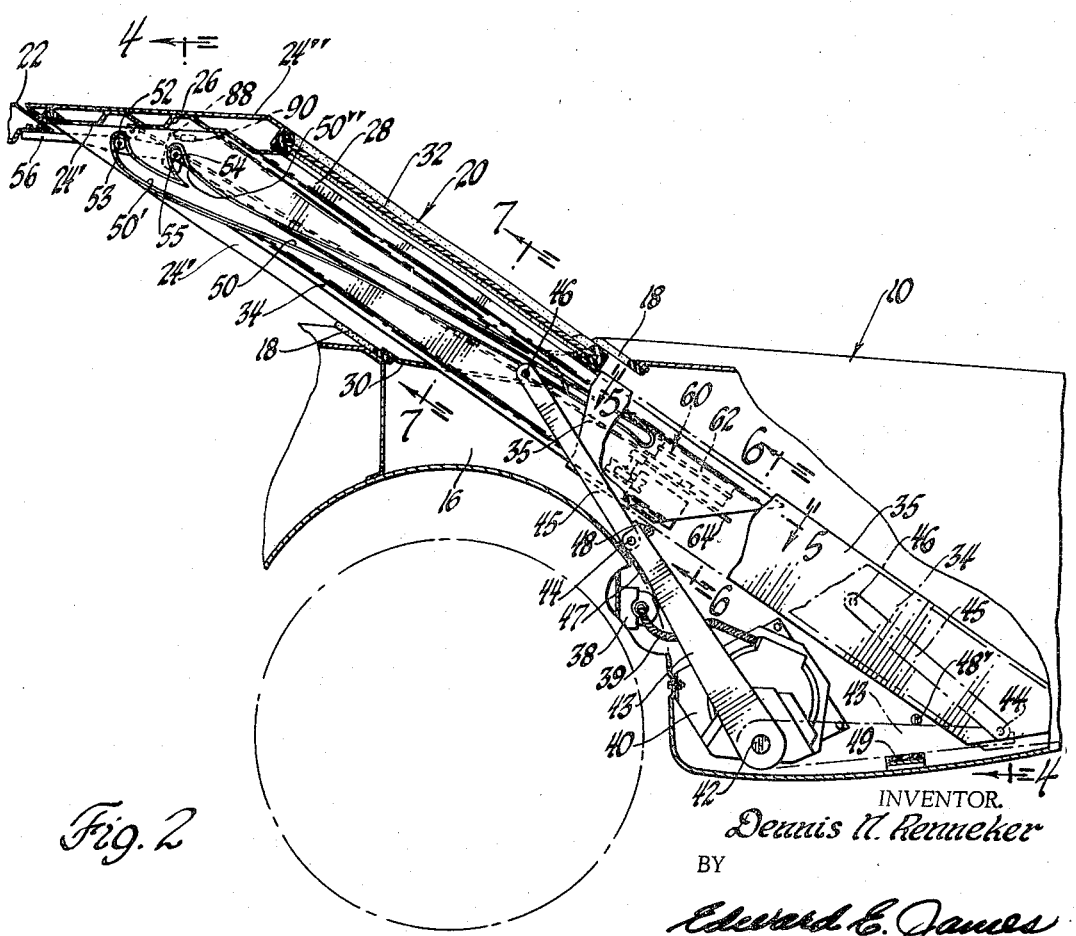
FIGURE 2 is an enlarged fragmentary view corresponding to a portion of FIGURE 1 with additional body and top portions broken away and further illustrates the roof supporting body structure, the retractable hardtop roof and the various elements of the top actuating drive mechanisms in their extended, top raising positions.

FIGURE 7 is another fragmentary sectional view through one pillar or side of the rear roof section and is taken substantially in the plane indicated at 7—7 of FIGURE 2; and FIGURES 8a, b and c are fragmentary perspective views showing the retractable hardtop roof of the illustrated embodiment in its raised and fully extended body closing position, in its intermediate or partially raised landau forming position, and in its retracted body closing position, respectively.

Figure 1:
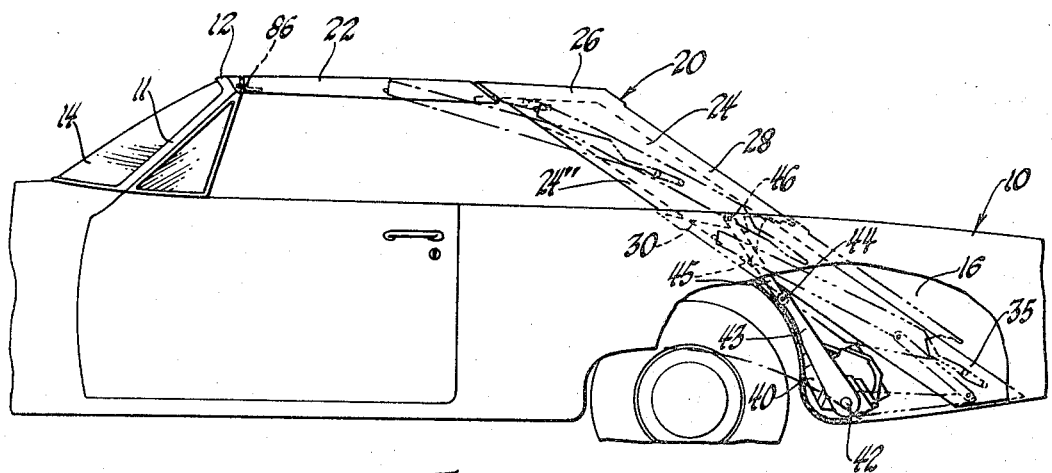
FIGURE 1 is a fragmentary side elevational view of a convertible body partially broken away and illustrates a retractable hardtop roof constructed in accordance with the invention in a raised, full-line indicated position and in a retracted broken-line indicated position.

Referring more particularly to the drawings, portions of a convertible vehicle body are generally indicated by the reference numeral 10. Two front doors provide access to a body defined passenger compartment but the invention would be equally applicable to a four-door body. Two vertically inclined pillars 11 and a transverse header 12 cooperate with the vehicle body to mount a windshield 14 forwardly of the passenger compartment in a conventional manner. As best seen in FIGURES 1–3, a top storing well 16 opens transversely of the body behind the rear seat of the passenger compartment and extends rearwardly and downwardly into the rear luggage compartment just behind the rear wheel housings of the body.

A retractable roof constructed in accordance with the invention is indicated generally by the reference numeral 20. This retractable roof comprises two cooperating sections 22 and 24. The forward roof section 22 is suitably mounted by a rear roof section 24 for power actuated movement between an extended body closing position in forward sealing engagement with the front windshield header, as shown in full lines in FIGURES 1 and 8a, and a retracted position contained within the rear roof member 24, as shown in broken and full lines in FIGURES 1 and 3. The rear roof member is in turn reciprocally mounted for linear movement or reciprocation relative to the body and power driven between a raised position, shown in full lines in FIGURES 1, 2 and 8a and 8c, and a retracted position within the top storing well 16, shown in full lines in FIGURES 3 and 8c and in broken lines in FIGURE 1.

The illustrative rear roof forming section 24 comprises inner and outer sheet metal panels 24′ and 24″. These two panels are suitably formed and secured together as shown in FIGURES 2, 3 and 7 to provide a reinforced rear roof panel 26 and two rearwardly and downwardly inclined rear quarter pillars 28 of hollow rectangular cross section. A third sheet metal panel 30 is secured to the lower inside pillar ends of the inner panel 24′ and forms a top well closing package shelf when the rear roof forming member 24 is in its raised position. The panels 24′, 24″ and 30 are rearwardly flanged as shown and form a recessed or shouldered rear window opening. A resilient weatherstrip secured within this opening mounts a rigid glass rear window 32.

As shown in FIGURES 2, 3 and 7, a flanged guide member 34 is secured to and reinforces the pillar portion of each inner roof panel 24′. These guide members both extend some distance below the rear pillar forming panels. Cooperating body attached guide members 35 extend rearwardly and downwardly behind each rear wheel housing from the adjacent side of the top well opening. The two guide members 35 telescopically embrace the two pillar attached guide members 34. Each guide member 35 is flanged inwardly to form opposing channels. Several bearings 36 and 37 are supported longitudinally of these opposing channels and slidably mount the flanged forward edge and the channeled rear portion, respectively, of the cooperating pillar attached guide member. The bearings 36 and 37 may be made of Teflon or similar bearing materials. Such bearings minimize sliding friction and noise between the guide members and accommodate the minor variations in manufacturing tolerances which often occur between the cooperating portions of the vehicle body and rear roof section.

The power actuating mechanism for the rear roof section or member 24 is best shown in FIGURES 2–4 and includes a reversible motor 38. This motor is mounted transversely of the vehicle body between the rear wheel housings. Two flexible cables 39 drivingly connect the motor 38 to separate worm-driven reduction gear units 40. These units are of opposite hand and suitably mounted rearwardly of each rear wheel housing. While only the left-hand unit is shown in the accompanying drawings, the following description is equally applicable to both units.

Each gear unit 40 has a sector gear driven output shaft 42. A lift arm or lever 43 is secured to each shaft 42 and is swingable therewith through a stop-limited sector of approximately 120°. The swinging end of each lever 43 is pivotally and drivingly connected at 44 to the lower end of a tie link 45. The upper end of each tie link is pivotally connected at 46 to the lower end of the adjacent rear roof pillar. The two motor driven gear units 40, the levers 43 and the tie links 45 thus cooperate to equalize the actuating movement imparted to each pillar of the rear roof section.

When the motor 38 is selectively energized to raise the rear roof section, the lift arms 43 are rotatably driven upwardly in a counterclockwise direction as viewed in FIGURES 1–3. Such lift arm movement is translated by the tie links 45 into linear movement sliding the rear roof section upwardly with respect to the guide members 35. As the rear roof section approaches its fully raised position, its outwardly flanged lower periphery and the transverse panel 30 slidably engage a body mounted weatherstrip 18 and thus sealingly close the top well opening. In their extreme fully raised positions, the lift arms 43 and their respective tie links 45 are extended to assume a stop-limited straight-line relationship which, as best shown in FIGURE 2, tends to maintain the lift arms in roof supporting abutment with resilient stop pads 47 mounted on the adjacent wheel housings. Two solenoids 48 are spaced rearwardly of the two stop pads. Each solenoid has a spring biased armature adapted to engage and lock the adjacent lift arm 43 in its extreme roof supporting position against the corresponding wheel housing pad 47. The rear roof section is thus locked and maintained in its raised position.

The two lift arm locking solenoids 48 are electrically interconnected and adapted to be simultaneously energized whenever the motor 38 is selectively energized to lower the rear roof section. The lift arm locking armatures of these solenoids are thus withdrawn to permit subsequent motor driven rotation of the lift arms 43 in a clockwise direction as viewed in FIGURES 1–3. Such lift arm rotation slidably retracts the rear roof section until the lift arms engage two body attached stop pads 49. These stop pads define the fully retracted position of the rear roof section. In this retracted position, the upper panel of the rear roof section is coextensive with the beltline and rear deck of the vehicle body and sealingly engages the weatherstrip 18 and thus closes the top well opening. Two lift arm locking solenoids 48′ similar to the solenoids 48 may be mounted on the body in spaced relation to the stop pads 49. The spring biased armatures of these solenoids are adapted to engage and lock the lift arms 43 and thereby the rear roof section in their extreme fully retracted positions. The solenoids 48′ are electrically interconnected and otherwise adapted to be simultaneously energized to release the lift arms whenever the motor is selectively energized to raise the rear roof section.

As shown in FIGURE 7, the pillar portions of the inner roof panel 24' and the attached guide members 34 are perforated longitudinally and flanged inwardly to form two opposing slots or guide tracks 50. As further shown in FIGURES 2 and 3, these guide tracks or slots are inclined obliquely and forwardly of each pillar and are split and curved upwardly adjacent their upper ends to form branch guide tracks 50' and 50". Each guide track 50 is dimensioned to receive a spaced pair of nylon or Teflon rollers 52 and 54. These paired guide rollers are suitably journaled on parallel stub shafts or pins 53 and 55 carried by and projecting laterally outwardly of a forward roof supporting arm 56. Two of these roller mounting arms are secured to and extend rearwardly from the opposite rear undercorners of the forward roof section 22. The rollers 52 nd 54 thus cooperate with the two opposing guide tracks 50 to guide and support the forward roof section during movement between its retracted position within the rear roof section 24 and its extended body closing position.

In the illustrative embodiment, the forward roof section 22 is drivingly connected for power actuation between its retracted and extended positions relative to the raised rear roof section by a motor driven pulley-cable drive mechanism indicated generally by the reference numeral 60. This forward roof actuating mechanism is carried by the rear roof section 24 and includes a cable winding drum 62. The drum 62 is rotatably mounted by a bracket 64 secured to the end of the guide member 34 extending below the left rear roof pillar. The drum 62 is helically grooved to form two opposite cable winding sheaths and is drivingly connected for rotation in either direction by a reversible motor 68 through a worm and pinion gear reduction drive including a motor driven worm 70, intermediate gears 71 and 72, and a drum driving gear 74.

As best seen in FIGURES 2 and 4–6, paired lift and return cables 76, 76' and 78, 78' are connected to the separate sheaths of the drum 66. These cables are alternately wound or unwound on the drum in accordance with its motor driven direction of rotation. The distal ends of the lift cables 76 and 76' are suitably connected to the forward roof section by the two stub shafts 53 journaling the forward guide rollers 52. The intermediate portion of the lift cable 76 is threaded over two idler pulleys 80 and 81 which are rotatably mounted on the guide member 34 adjacent the upper and lower ends, respectively, of the roller mounting guide track 50 formed within the left rear roof pillar. The intermediate portion of the other lift cable 76' is threaded over the idler pulleys 80' and 81' similarly mounted and located with respect to the guide member and track formed within the right rear roof pillar after first passing over a cross-body transfer pulley 83 journaled on the underside of the package shelf forming panel 30. The ends of the return cables 78 and 78' remote from the drum 66 are connected to the forward roof section by the stub shafts 55 journaling the rear guide rollers 54. The return cable 78 first passes over a single idler pulley 82 mounted on the left guide member 34 below the lower end of the adjacent guide track 50. The intermediate portion of the other return cable 78' passes over a cross-body transfer pulley 85 and an idler pulley 82' mounted on the right guide member below the guide track 50.

By selectively energizing the motor 68 when the rear roof section is in its fully raised position, the drum 66 may be rotated in either direction. When rotated in a clockwise direction as viewed in FIGURES 4 and 5, the resultant winding of the cables 76 and 76' and unwinding of the cables 78 and 78' relative to the drum causes the forward roof section to be carried upwardly and forwardly of the rear roof section. As the rollers 52 and 54 approach the upper ends of the pillar formed guide tracks 50, the gravitational movement applied to the forward roof section 22 causes the spaced rollers 52 and 54 to pass upwardly into the guide track branches 50' and 50", respectively. The forward roof section is thus permitted to swing downwardly in a counterclockwise direction, as viewed in FIGURES 1 and 2, and is guided by the track mounted rollers toward its fully extended position closing the passenger compartment of the vehicle body. As the forward roof section approaches its fully extended position, two or more pins 86 spaced laterally and projecting forwardly from its transverse forward edge are adapted to be inserted into several mating openings 87 provided in the front windshield header 12. During subsequent final closing movement of the forward roof section, such pin engagement pilots the forward roof edge into proper sealing engagement with the front windshield header as the rear edge of the forward roof section is carried upwardly into weather sealing engagement with the transverse forward edge of the rear roof section.

If desired, the forwardly projecting ends of the several pins 86 may be formed to provide for top locking engagement with a concealed latch mechanism, not shown, mounted in the windshield header. In the illustrative embodiment, however, the forward roof section is normally locked and maintained in its fully extended, body closing position by two detent levers 88. These detent levers are pivotally mounted inwardly of the two rear roof pillars and are spring biased and notched so as to receive and retain the stub shafts 55 as the forward roof supporting guide rollers 52 and 54 engage the upper ends of their respective branch guide tracks 50' and 50", respectively. Such stub shaft retention by the detent levers 88 thus cooperates with the engagement effected forwardly between the pilot pins 86 and the windshield header to lock the forward roof section in its raised position.

Two solenoids 90 are mounted within the rear roof pillars adjacent each forward roof locking detent lever 88. Each of these solenoids has an armature or plunger shiftable into stub shaft releasing engagement with the adjacent spring biased detent lever. These two solenoids are electrically interconnected and included in the forward roof retracting control circuit. During initial forward roof retracting control operation, these two solenoids are initially energized to release the forward roof section for subsequent retraction into the rear roof section. Such retraction occurs as the motor 68 is selectively energized and rotatably drives the drum 66 in a counterclockwise direction. Such drum rotation unwinds the lift cables 76 and 76' and simultaneously winds the return cables 78 and 78' on the drum 62 thereby drawing the forward roof supporting rollers 52 and 54 downwardly of their respective guide tracks 50. The forward roof section is thus withdrawn to its fully retracted position within the raised rear roof section.

The rear roof section may be supported and maintained in its raised landau forming position by the lift arm locking solenoids 48. When these solenoids are energized to release the lift arms 43, the motor 38 may be selectively energized to swing the two lift arms 43 and the tie links 45 rearwardly and downwardly with respect to reduction gear driven output shafts 42 thereby slidably retracting the rear roof section downwardly to its body closing, top well stored position.

From the foregoing description, it should be noted that the illustrative embodiment provides an improved hardtop roof of simple sectional construction which may be power driven and easily and inexpensively mounted and controlled to provide the various objects, advantages and features of the invention as enumerated below. It should be further noted that various changes and variations might be made in and from this illustrative embodiment without departing from the spirit and scope of the following claims.

I claim:
1. In combination with a vehicle body having a wind- shield support, a passenger compartment and a storage compartment located rearwardly thereof, a retractable hardtop for closing the passenger compartment comprising, a rear section including a pair of side panels mounted on the body for reciprocation vertically of the body between a raised positon and a stored position within the storage compartment, an upper panel interconnecting the side panels, means for reciprocating the rear section, a forward section mounted on the rear section for movement relative thereto when in raised position between a vertically extending retracted position between the side panels within the rear section and a horizontal extended position engaging the windshield support, the forward section having a greater longitudinal dimension than the rear section upper panel, and means for so moving the front section, the front and rear sections in their respective extended and raised positions closing the passenger compartment.

2. The combination of claim 1, wherein the rear section upper panel closes the storage compartment in stored position and the rear section includes a transverse lower panel extending between the side panels for closing the storage compartment in raised position, the forward section in its retracted position being located within the confines of the upper, lower and side panels.

3. The combination of claim 1, wherein the rear section reciprocating means include actuating means for moving the rear section and locking means for locating the rear section in the raised and stored positions, and the front section moving means include second actuating means for moving the front section and second locking means for locating the front section in extended and retracted positions.

4. The combination of claim 3, including control means interconnecting the first and second actuating means and the first and second locking means and selectively operable to position the retractable hardtop in a first position closing the passenger compartment, wherein the front and rear sections are in their respective extended and raised positions, a second position partially opening the passenger compartment, wherein the front and rear sections are in their respective retracted and raised positions, and a third position completely opening the passenger compartment, wherein the front and rear sections are in their respective retracted and stored positions.

5. In combination with a vehicle body having a windshield support, a passenger compartment, a rear luggage compartment and a storage compartment located between the passenger and luggage compartments, a retractable hardtop for closing the passenger compartment comprising, a rear section having a pair of spaced vertically angled side members, a transverse upper panel extending between the side panels, a transverse lower panel extending between the side panels and a rear panel extending between the upper, lower and side panels; means mounting the rear section on the body for reciprocation between a stored position within the storage compartment, in which the upper panel closes the storage compartment, and a raised position extending at a vertical angle from the body, in which the lower panel closes the storage compartment; actuating means for reciprocating the rear section; locking means for releasably locking the rear section in raised and lowered positions; a forward section having a greater longitudinal dimension than the rear section transverse upper panel; means mounting the forward section on the rear section for movement relative thereto in the raised position thereof between a horizontal extended position engaging the windshield support and a vertically angled retracted position within the confines of the rear section side, upper, lower and rear panels; second actuating means for so moving the forward section; second locking means for releasably locking the front section in extended and retracted positions; and control means interconnecting the first and second locking means and the first and second actuating means and selectively operable to position the retractable hardtop in a first position closing the passenger compartment, wherein the front and rear sections are in their respective extended and raised positions, a second position partially opening the passenger compartment, wherein the front and rear sections are in their respective retracted and raised positions, and a third position completely opening the passenger compartment, wherein the front and rear sections are in their respective retracted and stored positions.

References Cited

UNITED STATES PATENTS

| | | | |
|---|---|---|---|
| 1,184,734 | 5/1916 | Freeman | 296—107 X |
| 1,272,539 | 7/1918 | Saunders | 296—107 |
| 3,021,174 | 2/1962 | Rund | 296—107 |
| 3,271,067 | 9/1966 | Rollman | 296—116 |

FOREIGN PATENTS

| | | |
|---|---|---|
| 756,531 | 9/1956 | Great Britain. |
| 978,638 | 12/1964 | Great Britain. |

BENJAMIN HERSH, *Primary Examiner.*

MILTON BUCHLER, *Examiner.*

C. C. PARSONS, *Assistant Examiner.*